United States Patent
Zeng et al.

(10) Patent No.: US 10,451,764 B2
(45) Date of Patent: Oct. 22, 2019

(54) CAPACITIVITY AND FREQUENCY EFFECT INDEX DETECTION DEVICE AND METHOD, AND EXPLORATIVE SUBSTANCE IDENTIFICATION METHOD

(71) Applicant: Chengdu Co-win Geological Exploration Technology Co., Ltd, Chengdu, Sichuan (CN)

(72) Inventors: Yuting Zeng, Sichuan (CN); Youming Deng, Sichuan (CN)

(73) Assignee: Chengdu Co-win Geological Exploration Technology Co., Ltd, Chengdu (CN)

( * ) Notice: Subject to any disclaimer, the term of this patent is extended or adjusted under 35 U.S.C. 154(b) by 701 days.

(21) Appl. No.: 14/786,994

(22) PCT Filed: Apr. 24, 2014

(86) PCT No.: PCT/CN2014/076162
§ 371 (c)(1),
(2) Date: Oct. 26, 2015

(87) PCT Pub. No.: WO2014/173310
PCT Pub. Date: Oct. 30, 2014

(65) Prior Publication Data
US 2016/0077233 A1    Mar. 17, 2016

(30) Foreign Application Priority Data
Apr. 26, 2013   (CN) .......................... 2013 1 0149092

(51) Int. Cl.
*G01V 3/38*      (2006.01)
*E21B 47/00*     (2012.01)
(Continued)

(52) U.S. Cl.
CPC ............... *G01V 3/38* (2013.01); *E21B 47/00* (2013.01); *E21B 49/00* (2013.01); *G01V 3/06* (2013.01); *G01V 3/24* (2013.01)

(58) Field of Classification Search
CPC .... G01V 3/38; G01V 3/06; G01V 3/24; E21B 47/00; E21B 49/00
(Continued)

(56) References Cited

U.S. PATENT DOCUMENTS 4,486,836 A * 12/1984 Lacour-Gayet .......... G01V 3/38
                                                    324/323
4,654,598 A * 3/1987 Arulanandan ....... G01N 27/223
                                                    324/347
(Continued)

FOREIGN PATENT DOCUMENTS

CN      1363844 A    8/2002
CN      1924615 A    3/2007
(Continued)

OTHER PUBLICATIONS

International Search Report of PCT Patent Application No. PCT/CN2014/076162 dated Jul. 14, 2014.

*Primary Examiner* — Gregory J Toatley, Jr.
*Assistant Examiner* — Douglas Kay

(57) ABSTRACT

Capacitivity and frequency effect index detection device and method, the device comprising a signal generator for generating alternating current signal having at least two frequencies; a current and phase generation module for generating current and phase information corresponding to each frequency; a first and second test electrodes, the first test electrode for sending the signal to a first position in a test area; the second test electrode for providing reference voltage at a second location in the test area; the first test electrode also for generating voltage information corresponding to each frequency, the voltage information as
(Continued)

voltage information of the first position relative to the reference voltage of the second position; and a processing unit for determining at least one type of parameter information corresponding to each frequency and determining the capacitivity and frequency effect index of the test area according to any two frequencies and the parameter information.

12 Claims, 2 Drawing Sheets

(51) Int. Cl.
E21B 49/00 (2006.01)
G01V 3/06 (2006.01)
G01V 3/24 (2006.01)

(58) Field of Classification Search
USPC .............................................. 702/7
See application file for complete search history.

(56) References Cited

U.S. PATENT DOCUMENTS

| | | | | |
|---|---|---|---|---|
| 5,397,896 A * | 3/1995 | Weiss | ................... | B82Y 10/00 204/400 |
| 5,434,842 A * | 7/1995 | Weiss | ................... | B82Y 10/00 369/126 |
| 6,496,020 B1 * | 12/2002 | Davey | ................... | G01N 27/221 324/667 |
| 6,571,606 B2 * | 6/2003 | Fleury | ................... | H01R 24/52 439/578 |
| 10,132,847 B2 * | 11/2018 | Xie | ................... | G01R 27/00 |
| 2001/0046811 A1 * | 11/2001 | Fleury | ................... | H01R 24/52 73/38 |
| 2004/0014240 A1 * | 1/2004 | Takeguchi | ........... | G01N 27/305 436/518 |
| 2005/0093548 A1 * | 5/2005 | Ueda | ................... | G01N 27/043 324/357 |
| 2007/0239402 A1 * | 10/2007 | Scott | ................... | G01N 22/00 702/189 |
| 2008/0041733 A1 * | 2/2008 | Hibbs | ............... | G01N 33/48721 205/775 |
| 2012/0143508 A1 * | 6/2012 | Klein | ................... | G01V 3/38 702/7 |
| 2013/0096833 A1 * | 4/2013 | Hanna | ................... | G01V 3/24 702/11 |
| 2013/0144548 A1 * | 6/2013 | Xie | ................... | G01R 27/00 702/65 |
| 2015/0177406 A1 * | 6/2015 | Li | ................... | G01V 3/24 702/7 |

FOREIGN PATENT DOCUMENTS

| | | | | |
|---|---|---|---|---|
| CN | 101413910 A | | 4/2009 | |
| CN | 101649738 A | | 2/2010 | |
| CN | 102454398 A | | 5/2012 | |
| CN | 102565858 A | | 7/2012 | |
| CN | 102692652 A | | 9/2012 | |
| CN | 102692652 B | * | 12/2014 | |
| DE | 19948684 A1 | * | 5/2001 | ........ G01N 27/221 |
| JP | 2003084069 A | | 3/2003 | |

* cited by examiner

CAPACITIVITY AND FREQUENCY EFFECT INDEX DETECTION DEVICE AND METHOD, AND EXPLORATIVE SUBSTANCE IDENTIFICATION METHOD

TECHNICAL FIELD

The present invention relates to the field of exploration and logging, and particularly to a capacitivity and frequency effect index detective device and method, and an exploration substance identification method.

BACKGROUND ART

A resistivity method, impedance method, induced polarization method, complex resistivity method, and double electrical method are normally applied when geological exploration and logging are performed. However, there is a common shortage in these methods, i.e., it is impossible to use only one parameter for making a qualitative analysis on the substance to be detected, but other physical parameters need to be taken into consideration for making a comprehensive comparison, in order to analyze and obtain a conclusion.

For example, the resistivity in response to petroleum is high when petroleum is explored by using the resistivity method. However, the resistivity in response to a stratum with low water salinity is also high, and the resistivity in response to a stratum with low porosity is high as well. Therefore, the petroleum cannot be identified depending only on the resistivity, and it is necessary to add the water salinity parameters and porosity parameters of the stratum into consideration for making a comprehensive analysis and drawing a conclusion.

In addition, since the water salinity parameters and porosity parameters of the stratum need to be added, it is also necessary to introduce a porosity measurement instrument for detecting the porosity of the stratum and a detection device of water salinity for detecting the water salinity of the stratum (or the water salinity parameters of the stratum is obtained from the relevant department). As a result, a qualitative analysis of the object to be detected cannot be achieved only by using one detection device.

Thus, if a user wants to use the existing method to make a qualitative analysis on the substance to be detected, it is necessary to use a plurality of detection devices to detect a plurality of parameters, and then collectively anal size the plurality of parameters, which makes the analysis process very cumbersome and the exploration efficiency low. In addition, this method is inconvenient for the user, and would also lead to increased exploration cost.

Disclosure of the Invention

The object of the present invention is to provide a capacitivity and frequency effect index detection device and method, and an exploration substance identification method, in order to achieve an innovative qualitative analysis method for exploration substance based on the capacitivity and frequency effect index.

In order to achieve the above object, the present invention provides a capacitivity and frequency effect index detection device comprising: a signal generator for generating an alternating current signal having at least two different frequencies, and sending the alternating current signal to a current and phase information generation module; the current and phase information generation module for generating current and phase information corresponding to each frequency when the alternating current signal flows through it; a first test electrode and a second test electrode, wherein the first test electrode is used to send the alternating current signal, flowing through the current and phase information generation module, to a first position in a test area, the second test electrode is used to provide a reference voltage at a second location in the test area and receive the alternating current signal flowing back from the test area; and the first test electrode is also used to generate voltage information corresponding to each frequency after the alternating current signal refluxes through the second position in the test area, and the voltage information is voltage information of the first position relative to the reference voltage of the second position; and a processing unit for receiving the current and phase information corresponding to each frequency from the current and phase information generation module and receiving the voltage information corresponding to each frequency from the first test electrode; determining at least one parameter information corresponding to each frequency according to the current and phase information and the voltage information corresponding to each frequency, and determining the capacitivity and frequency effect index of the test area according to any two frequencies of the at least two different frequencies and the parameter information of the same type corresponding to the two frequencies.

The present invention also provides a capacitivity and frequency effect index detection method comprising: generating an alternating current signal having at least two different frequencies, and generating current and phase information corresponding to each frequency; sending the alternating current signal to a first position in a test area; providing a reference voltage at a second location in the test area; generating voltage information corresponding to each frequency after the alternating current signal refluxes through the second position in the test area, and the voltage information is voltage information of the first position relative to the reference voltage of the second position; determining at least one parameter information corresponding to each frequency according to the current and phase information and the voltage information corresponding to each frequency; and determining the capacitivity and frequency effect index of the test area according to any two frequencies of the at least two different frequencies and the parameter information of the same type corresponding to the two frequencies.

The present invention also provides an identification method of exploration substance comprising: obtaining a capacitivity and frequency effect index of a test area by using the capacitivity and frequency effect index detection method provided by the present invention; identifying exploration substance in the test area as water resource in the case that the capacitivity and frequency effect index of the test area is more than or equal to an upper limit of percent frequency effect.

The present invention also provides an exploration substance identification method comprising: obtaining an ion capacitivity of a test area; obtaining capacitivity and frequency effect index of the test area by using the detection method of capacitivity and frequency effect index provided by the present invention; identifying exploration substance in the test area as a conductive metal ore body in the case that the capacitivity and frequency effect index of the test area is less than or equal to a lower limit of percent frequency effect and the ion capacitivity thereof is more than or equal to an upper limit of ion capacitivity; or, identifying the exploration substance in the test area as oil and gas in the case that the capacitivity and frequency effect index of the test area is less than or equal to the lower limit of percent frequency effect and the ion capacitivity thereof is less than or equal to a lower limit of ion capacitivity.

The present invention has discovered an important physical phenomenon that the oil and gas, water and conductive metal ore body significantly affect the capacitivity and frequency effect index, which in turn laid a solid theoretical basis for identifying oil and gas, water resource and conductive metal ore body based on the capacitivity and frequency effect index.

The capacitivity and frequency effect index of the test area can be effectively detected by using the capacitivity and frequency effect index detection device and method provided by the present invention, so as to provide a data support subsequently for identifying exploration substance in a test area based on the capacitivity and frequency effect index.

In addition, the identification of exploration substance can be made based on the detected capacitivity and frequency effect index by using the exploration substance identification method provided by the present invention, in order to be able to qualitatively analyze what type of material the exploration substance belongs to. The entire identification process is very simple and convenient, and water resource can be identified by using only one physical parameter, the capacitivity and frequency effect index. The complex comparative analysis process is avoided while the exploration effectiveness of water resource is improved, thus the exploration efficiency can be significantly increased.

Furthermore, the present invention has also found the physical phenomenon that a conductive metal ore body and the oil and gas resources are significant different in terms of ion capacitivity. The conductive metal ore body or the oil and gas is identified by combining the capacitivity and frequency effect index with the ion capacitivity, so as to improve the exploration efficiency of the conductive metal ore body or the oil and gas. In addition, the capacitivity and frequency effect index and the ion capacitivity of the test area can be detected by using only the capacitivity and frequency effect index detection device and method provided by the present invention, without using other detection devices and methods to specifically detect the ion capacitivity. In this way, it is possible to not only bring convenience for the user, but also reduce the number of the used devices at the time of exploration, thereby reducing exploration costs and further improving the exploration efficiency.

Other features and advantages of the present invention will be described in detail in the following embodiments.

BRIEF DESCRIPTION OF DRAWINGS

The accompanying drawings, which are used to provide further understanding of the present invention and constitute a part of the specification, are used to explain the present invention together with the following embodiments, but not intended to limit the present invention in which.

DETAILED DESCRIPTION

Embodiments of the present invention will be described in detail below in combination with the accompanying drawings. It should be understood that the specific embodiments described herein are only intended to illustrate and explain the present invention and are not intended to limit the present invention.

In the present invention, based on the sensitive characteristics of water, a conductive metal ore body, and oil and gas to the capacitivity and frequency effect index, the exploration substances in the exploration area (in the present invention, the exploration substances include water resource, a conductive metal ore body and the oil and gas) are identified by detecting the capacitivity and frequency effect index. In the following, the sensitive characteristics of water, a conductive metal ore body and the oil and gas to the capacitivity and frequency effect index is first described, so as to provide a theoretical basis for identifying the exploration substances by using the capacitivity and frequency effect index.

Figure 1:
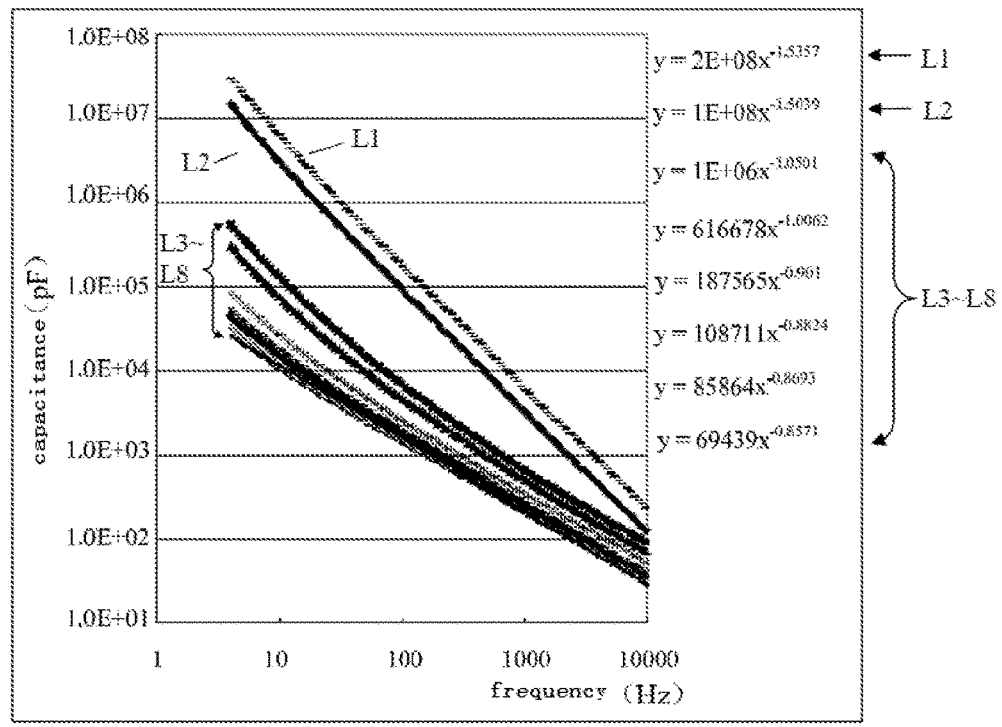
FIG. 1 shows an actual measured data graph of the capacitance and frequencies of aqueous solution having different salinity and the sand body having different moisture content, under a geological condition.

FIG. 1 shows an actual measured data graph of the capacitance and frequency of the aqueous solution having different salinity and the sand body having different moisture content, under a geological condition. As shown in FIG. 1, the curve L1 shows the capacitance-frequency relationship of an aqueous solution having the salinity of 60 g/L, wherein y represents the capacitance (pF), and x represents a frequency (Hz). The capacitivity and frequency effect index of the aqueous solution is 1.5357. Curve L2 shows the capacitance-frequency relationship of an aqueous solution having the salinity of 30 g/L, wherein the capacitivity and frequency effect index of the aqueous solution is 1.5039. It can be seen by comparing Curve L1 to Curve L2 that the capacitivity and frequency effect index of an aqueous solution having the salinity of 60 g/L is not very different from that of an aqueous solution having the salinity of 30 g/L. That is to say, the capacitivity and frequency effect index is not sensitive to the salinity.

In addition, in FIG. 1, Curves L3~L8 show the capacitance-frequency relationship of sand bodies having different moisture contents, wherein the moisture contents of the sand bodies to which Curves L~L8 correspond are in descending order, namely the moisture content of the sand body to which Curve L3 corresponds is maximum, and the moisture content of the sand body to which Curve L8 corresponds is minimum. The capacitivity and frequency effect indexs corresponding to individual curves are 1.0501, 1.0062, 0.901, 0.8824, 0.8693, and 0.8571. Thus, it can be seen that the capacitivity and frequency effect indexs decrease significantly along with the decrease of the moisture contents. Thus, the moisture content sensitively affects the capacitivity and frequency effect index. In addition, it can be also concluded through the test that the higher the moisture content is, the higher the capacitivity and frequency effect index is.

Figure 2:
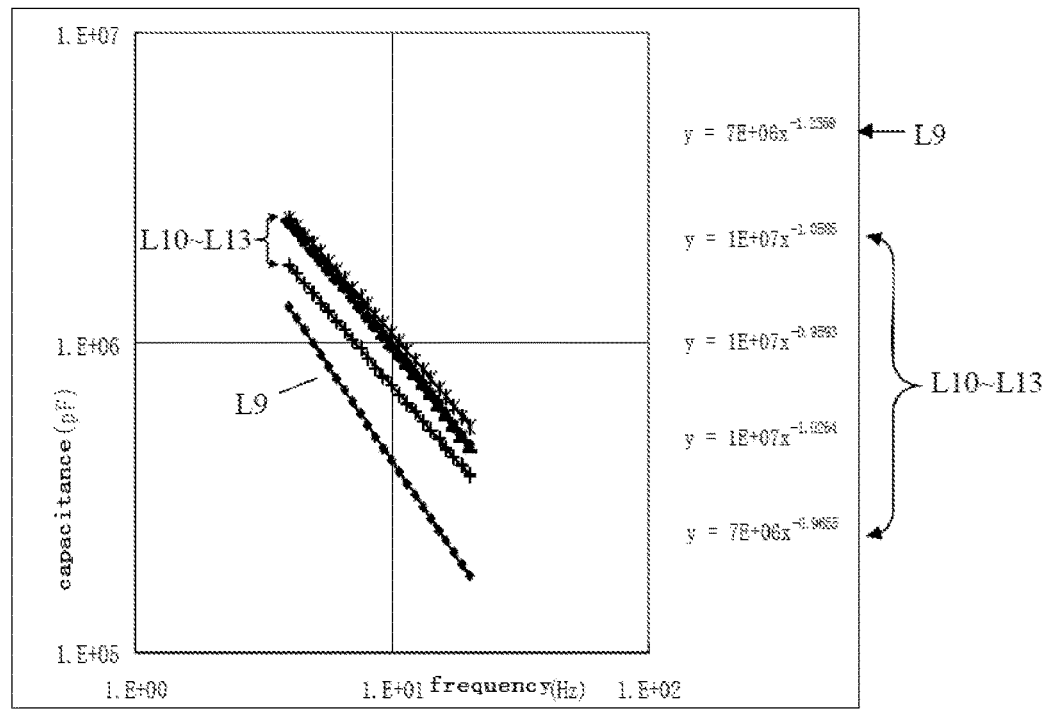
FIG. 2 shows an actual measured data graph of the capacitance and frequencies of the ordinary wet earth-surface and the wet earth-surface containing different conductive metal ore bodies, under a geological condition.

FIG. 2 shows an actual measured data graph of the capacitance and frequency of the ordinary wet earth-surface and the wet earth-surface containing different conductive metal ore bodies, under a geological condition. As shown in FIG. 2, L9 shows the capacitance-frequency relationship under the ordinary wet earth-surface, wherein the capacitivity and frequency effect index of the ordinary wet earth-surface is 1.2359. L10~L13 show the capacitance-frequency relationships of the ordinary wet earth-surface containing different conductive metal ore bodies, wherein the capacitivity and frequency effect indexes corresponding to individual curves were 1.0585, 0.9593, 1.0264, and 0.9655, respectively. It can be seen that the capacitivity and frequency effect index of the earth-surface containing the conductive metal ore body decreased significantly, compared to the ordinary wet earth-surface. Therefore, the conductive metal ore body also sensitively affects the capacitivity and frequency effect index. In addition, it can be also concluded through the test that the higher the content of the conductive metal ore body is, the lower the capacitivity and frequency effect index is.

Similarly, the capacitance-frequency relationship of the oil and gas can be obtained by using a similar test method. It can be concluded through the capacitance-frequency relationship that the oil and gas also sensitively affects the capacitivity and frequency effect index. Moreover, the higher the content of the oil and gas is, the lower the capacitivity and frequency effect index is.

In summary, it can be seen that these three exploration substances, the water, the conductive metal ore body and oil and gas, sensitively affect this one parameter, i.e., the capacitivity and frequency effect index, which lays a solid theoretical basis for identifying these three exploration substances by using the capacitivity and frequency effect index.

In order to identify exploration substances of a plurality of the test areas (also referred to as "measuring points") in the exploration area, it is first necessary to detect the capacitivity and frequency effect index of these test areas. The capacitivity and frequency effect index detection device and method provided by the present invention will be described below in combination with FIGS. 3 and 4.

Figure 3:
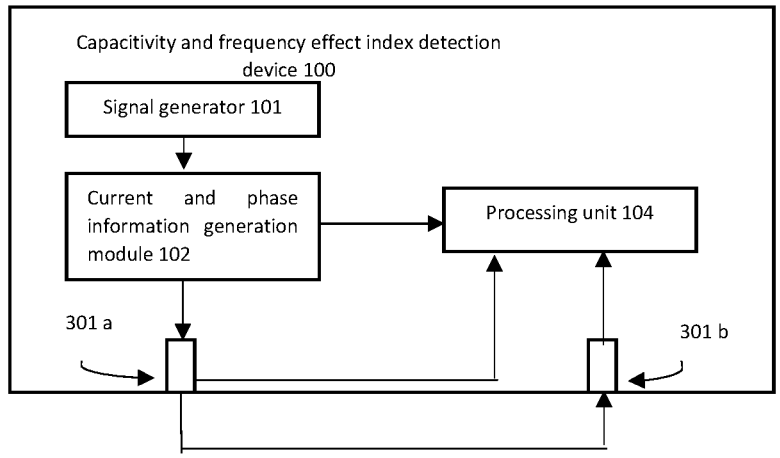
FIG. 3 shows a structural schematic view of the capacitivity and frequency effect index detection device according to an embodiment of the present invention.

First, referring to FIG. 3, FIG. 3 shows a structural schematic view of the capacitivity and frequency effect index detection device 100 according to an embodiment of the present invention. As shown in FIG. 3, the device 100 may include: a signal generator 101 for generating an alternating current signal having at least two different frequencies and transmitting the alternating current signals to a current and phase information generation module 102; the current and phase information generation module 102 for generating current and phase information corresponding to each frequency when the alternating current signal flows through it; a first test electrode 103a and a second test electrode 103b, wherein the first test electrode 103a is used for sending to a first position in the test area the alternating current signal flowing through the current and phase information generation module, the second test electrode 103b is used for providing a reference voltage at a second location in the test area and receiving the alternating current signal flowing back from the test area, and the first test electrode 103a is also used for generating voltage information corresponding to each frequency after the alternating current signal flows back through the second position in the test area, with the voltage information as the voltage information of the first position relative to the reference voltage of the second position; and a processing unit 104 for receiving the current and phase information corresponding to each frequency from the current and phase information generation module 102 and receiving the voltage information corresponding to each frequency from the first test electrode 103a, determining at least one parameter information corresponding to each frequency based on the voltage information and the current and phase information corresponding to each frequency, and determining the capacitivity and frequency effect index of the test area based on any two of the at least two different frequencies and parameter information of the same type corresponding to the two frequencies.

Specifically, the signal generator 101 can generate an alternating current signal having at least two different frequencies in a sweep mode or a combined waveform mode, wherein each frequency in the at least two different frequencies is greater than 0 Hz, and less than or equal to 10 KHz. Preferably, in the case that the detection device 100 is used for ground exploration, the at least two different frequencies can be selected from a frequency range of 0.001 Hz~1000 Hz, for example, two frequencies, 1 Hz and 8 Hz, can be selected. Alternatively, in the case that the detection device 100 is used for logging, the at least two different frequencies can be selected from a frequency range of 1 Hz~10000 Hz, for example, two frequencies, 24 Hz and 192 Hz, can be selected.

The alternating current signal flows into the current and phase information generation module 102 after generated from the signal generator 101. When the alternating current signal flows through the current and phase information generation module 102, the current and phase information generation module 102 can generate current and phase information corresponding to each frequency.

Then, the alternating current signal flowing through the current and phase information generation module 102 is sent to a first position in a test area via the first test electrode 103a. The alternating current signal flows back to the second test electrode 103b after flowing through the test area. The second test electrode 103b can provide a reference voltage at a second position, such as, zero voltage. In this way, after the alternating current signal flows back to the second test electrode 103b, the voltage information corresponding to each frequency can be generated at the first test electrode 103a, wherein the voltage information is the voltage information of the first position relative to the reference voltage of the second position.

The processing unit 104 can receive the current and phase information corresponding to each frequency from the current and phase information generation module 102, and receive the voltage information corresponding to each frequency from the first test electrode 103a. Then, the processing unit 104 can determine at least one kind of parameter information corresponding to each frequency according to the voltage information and the current and phase information corresponding to each frequency, wherein the parameter information may be, for example, reactive current Ix, capacitive reactance Xc, capacitance C, or ion capacitivity $\mathcal{E}$. That is to say, the processing unit 104 can determine at least one of the reactive current Ix, capacitive reactance Xc, capacitance C, and ion capacitivity $\mathcal{E}$ corresponding to each frequency The method for determining the reactive current Ix, capacitive reactance Xc, and capacitance C under one frequency based on the voltage information and the current and phase information under this frequency is well known to those skilled in the art, and therefore it is not repeated herein. In addition, after the capacitance C is determined, the ion capacitivity $\mathcal{E}$ can be determined by following equation (1):

$$\mathcal{E} = Kc \times C \tag{1}$$

wherein C is a capacitance value, $\mathcal{E}$ is a ion capacitivity (in the unit of F/m), and Kc is an electrode coefficient (in the unit of 1/m).

The processing unit 104 can arbitrarily select two frequencies from the at least two different frequencies after the processing unit 104 determines at least one type of parameter information for each frequency. It is assumed that the two frequencies selected are a first frequency $f_1$ and a second frequency $f_2$, respectively. The processing unit 104 can determine the capacitivity and frequency effect index Fd of the test area according to these two frequencies, and the parameter information of the same type corresponding to these two frequencies.

For example, the capacitivity and frequency effect index Fd can be determined by the following equation (2):

$$Fd = \log_{\frac{f_1}{f_2}}\left(\frac{A_1}{A_2}\right) \quad (2)$$

wherein Fd represents the capacitivity and frequency effect index; $f_1$ represents the first frequency of the two frequencies; $f_2$ represents the second frequency of the two frequencies; $A_1$ represents one type of parameter information corresponding to the first frequency; $A_2$ represents the parameter information corresponding to the second frequency and in the same type with $A_1$. That is, both $A_1$ and $A_2$ are either the reactive current Ix, or the capacitive reactance Xc, or the capacitance C, or the ion capacitivity $\mathcal{E}$.

Thus, the capacitivity and frequency effect index of the test area can be obtained through the above method, so as to provide a data support for the identification of exploration substance which is performed subsequently.

As described above, the capacitivity and frequency effect index detection device 100 provided by the present invention can be used for the ground exploration or logging engineering. When used for the logging engineering, the capacitivity and frequency effect index detection device 100 provided by the present invention can not only detect the capacitivity and frequency effect index of the test area, but also detect the water saturation of the test area according to the capacitivity and frequency effect index (typically, in the logging engineering, the water saturation is an index to be measured), as further described below.

The processing unit 104 can also be used to determine the water saturation according to the capacitivity and frequency effect index. For example, the processing unit 104 can determine the water saturation by the following equation (3):

$$Sw = a\frac{Fd^n}{\phi} \quad (3)$$

wherein Sw represents the water saturation; Fd represents the capacitivity and frequency effect index; a represents a predetermined coefficient; $\phi$ represents a porosity; and n represents a frequency dispersion index. The values of a and n can be determined based on the actual situation of the test area. For example, in one embodiment, a=0.2, and n=4.9.

Thus, the capacitivity and frequency effect index detection device 100 provided by the present invention can also detect the parameter of water saturation. Unlike the existing detection method of water saturation, in the present invention, the water saturation is determined based on the capaci- tivity and frequency effect index. Thus, the capacitivity and frequency effect index detection device 100 provided by the present invention can achieve a new detection method of water saturation based on the capacitivity and frequency effect index, to meet the needs of the logging engineering.

Figure 4:
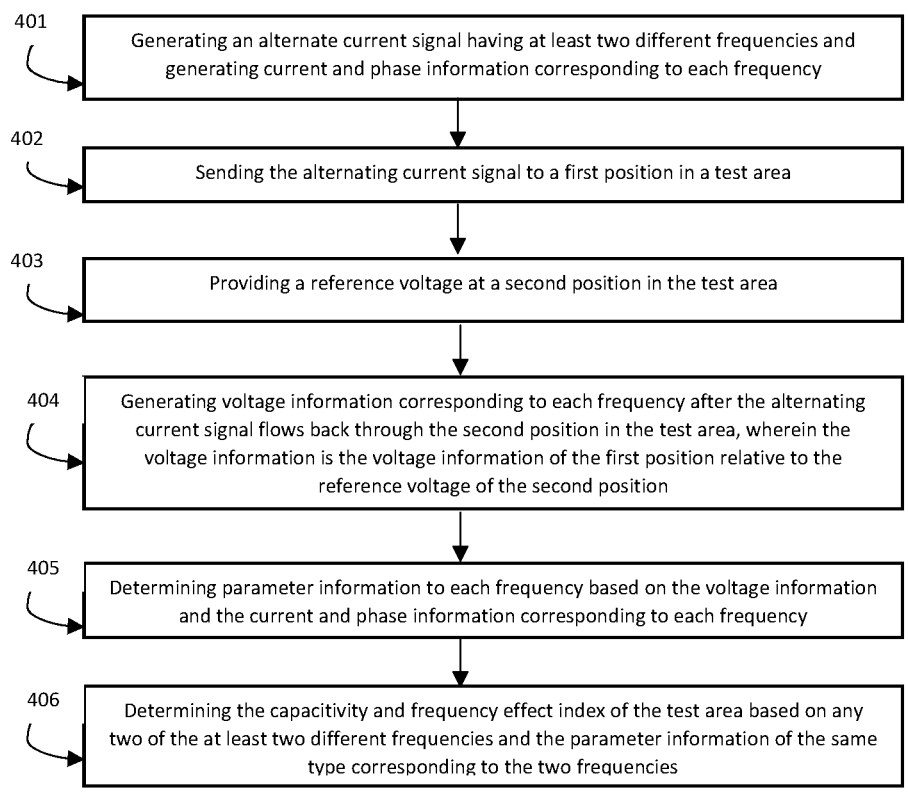
FIG. 4 shows a flow chart of the capacitivity and frequency effect index detection method according to an embodiment of the present invention.

FIG. 4 shows a flow chart of the capacitivity and frequency effect index detection method according to an embodiment of the present invention. As shown in FIG. 4, the detection method can comprise: Step S401, generating an alternating current signal having at least two different frequencies, and generating current and phase information corresponding to each frequency; Step S402, sending the alternating current signal to a first position in a test area; Step S403, providing a reference voltage at a second position in the test area; Step S404, generating voltage information corresponding to each frequency after the alternating current signal flows back through the second position in the test area, wherein the voltage information is the voltage information of the first position relative to the reference voltage of the second position; Step S405, determining at least one type of parameter information corresponding to each frequency based on the voltage information and the current and phase information corresponding to each frequency; and Step S406, determining the capacitivity and frequency effect index of the test area based on any two of the at least two different frequencies and the parameter information of the same type corresponding to the two frequencies, wherein the parameter information may be, for example, reactive current Ix, capacitive reactance Xc, capacitance C, or ion capacitivity $\mathcal{E}$.

Each of the at least two different frequencies is greater than 0 Hz, and less than or equal to 10 KHz. Preferably, in the case of performing the ground exploration, the at least two different frequencies can be selected from a frequency range of 0.001 Hz~1000 Hz, for example, two frequencies, 1 Hz and 8 Hz, can be selected. Alternatively, in the case that the logging is performed, the at least two different frequencies can be selected from a frequency range of 1 Hz~10000 Hz, for example, two frequencies, 24 Hz and 192 Hz, can be selected.

The capacitivity and frequency effect index Fd can be determined by the above equation (2), and the particular method and principle have been set forth in detail above, and therefore they are not repeated here.

In another embodiment of the present invention, in the case that the logging is performed, the detection method can further include: determining water saturation based on the capacitivity and frequency effect index. The water saturation Sw can be determined by the above equation (3), and the particular method and principle have been set forth above, and therefore they are not repeated here.

To sum up, the capacitivity and frequency effect index detection device and method provided by the present invention can effectively detect the capacitivity and frequency effect index of the test area (in the logging engineering, it can also detect the water saturation of test area to meet the requirement for the logging), so as to provide a data support for identifying subsequently the exploration substance of the test area based on the capacitivity and frequency effect index.

After the capacitivity and frequency effect indexes of a plurality of the test areas in the exploration area are detected, the identification of the exploration substance can be made based on the capacitivity and frequency effect indexes. The exploration substance identification method provided by the present invention will be described in detail below.

In one embodiment, the exploration substance identification method provided by the present invention can include: obtaining capacitivity and frequency effect index of a test area by using the capacitivity and frequency effect index detection method provided by the present invention; identifying the exploration substance in the test area as water resource (because, as described in conjunction with FIG. 1, the higher the moisture content, the higher the capacitivity and frequency effect index), in the case that the capacitivity and frequency effect index of the test area is more than or equal to a upper limit of percent frequency effect (generally regarded as "high abnormal").

The upper limit of the percent frequency effect can be determined according to the average of the capacitivity and frequency effect indexes of a plurality of the test areas of the exploration area at which the test areas are located and a preset upper limit of tolerance. The specific value of the upper limit of tolerance can be set according to an empirical value. For example, it is assumed that the average of capacitivity and frequency effect indexes for a plurality of test areas in the entire exploration area is $\overline{Fd}$, and the upper limit of tolerance is set as +10%. Then, the upper limit of percent frequency effect can be, for example, $\overline{Fd}+10\%*\overline{Fd}$.

This embodiment fully uses the physical phenomenon that the water sensitively affects the capacitivity and frequency dispersion characteristics and that the higher the moisture content is, the higher the capacitivity and frequency effect index is. Thus, water resources can be qualitatively determined according to the detected capacitivity and frequency effect index. The entire identification process is very simple and convenient and does not require other parameters. It is possible to not only improve the exploration effectiveness of water resources, but also avoid the complex comparative analysis process, and thus the exploration efficiency can also be significantly improved.

In another embodiment, the present invention also provides an exploration substance identification method comprising: obtaining ion capacitivity of a test area; obtaining capacitivity and frequency effect index of the test area by using the capacitivity and frequency effect index detection method provided by the present invention; identifying the exploration substance in the test area as a conductive metal ore body in the case that the capacitivity and frequency effect index of the test area is less than or equal to the lower limit of percent frequency effect (generally regarded as "low abnormal") and the ion capacitivity thereof is more than or equal to the upper limit of ion capacitivity (generally regarded as "high value"); or identifying the exploration substance in the test area as oil and gas in the case that the capacitivity and frequency effect index of the test area is less than or equal to the lower limit of percent frequency effect and the ion capacitivity thereof is less than or equal to the lower limit of ion capacitivity (generally regarded as "low value").

The ion capacitivity in the test area can be obtained by using any method well known to those skilled in the art. In a preferred embodiment, the ion capacitivity of the test area can be obtained by using the capacitivity and frequency effect index detection method provide by the present invention.

As described above, in Step S405 in the capacitivity and frequency effect index detection method provide by the present invention, at least one type of parameter information corresponding to each frequency is determined according to voltage information and current and phase information corresponding to each frequency, wherein the parameter information can be reactive current Ix, capacitive reactance Xc, capacitance C, or ion capacitivity $\epsilon$. That is to say, the ion capacitivity $\epsilon$ under a plurality of frequencies can directly or indirectly be obtained (obtained through other parameters such as the capacitive reactance Xc, and capacitance C) by this step.

Thus, when the exploration substances are identified, two parameters, i.e., the ion capacitivity and the capacitivity and frequency effect index of the test area, can simultaneously be obtained by using the capacitivity and frequency effect index detection method provided by the present invention without determining the ion capacitivity of the test area according to other methods, thereby providing convenience for the user and improving the exploration efficiency.

For one test area, a plurality of frequencies correspond to a plurality of ion capacitivities, respectively. The ion capacitivity under one frequency can arbitrarily be selected as the ion capacitivity of the test area.

The upper limit of the ion capacitivity can be determined according to the average of ion capacitivities of a plurality of the test areas in the exploration area at which the test areas are located and a preset first tolerance upper limit; and the lower limit of the ion capacitivity can be determined according to the average of ion capacitivities of a plurality of the test areas in the exploration area at which the test areas are located and a preset first tolerance lower limit. Specific values of the first tolerance upper limit and the first tolerance lower limit can be set based on the empirical value. For example, it is assumed that the average of the ion capacitivities for a plurality of test areas in the entire exploration area is $\overline{\epsilon}$, and first tolerance upper limit is set as +10%, and the first tolerance lower limit is set as −10%. Then, the upper limit of the ion capacitivity can be, for example, $\overline{\epsilon}+10\%*\overline{\epsilon}$, and the lower limit of the ion capacitivity can be, for example, $\overline{\epsilon}-10\%*\overline{\epsilon}$.

Here, it is noted that, as described above, for each of test areas, the ion capacitivity under one frequency can arbitrarily be selected as the ion capacitivity of the test area. Then, when the average $\overline{\epsilon}$ of ion capacitivities of a plurality of test areas is determined, it should be ensured that the ion capacitivities under the same frequency are selected for the plurality of test areas. For example, in the exploration of ground, the corresponding ion capacitivity under the frequency of 8 Hz is selected for each of test areas. Then, the ion capacitivities under the same frequency of individual test areas are averaged to obtain the average of the ion capacitivities. In this way, that the comparison of the ion capacitivities is made under the same frequency can be ensured.

In addition, the upper limit of the percent frequency effect can be determined according to the average of the capacitivities and percent frequency effects of a plurality of the test areas in the exploration area at which the test areas are located and a preset second tolerance upper limit; and the lower limit of the percent frequency effect can be determined according to the average of the capacitivities and percent frequency effects of a plurality of the test areas in the exploration area at which the test areas are located and a preset second tolerance lower limit. Specific values of the second tolerance upper limit and the second tolerance lower limit can be set based on the empirical value. For example, it is assumed that the average of the capacitivities and percent frequency effects for a plurality of test areas in the entire exploration area is $\overline{Fd}$, the upper second tolerance limit is set as +10%, and the second tolerance lower limit is set as −10%. Then, the upper limit of the percent frequency effect can be, for example, $\overline{Fd}+10\%*\overline{Fd}$, and the lower limit of the percent frequency effect can be, for example, $\overline{Fd}-10\%*\overline{Fd}$.

Thus, this one embodiment uses a physical phenomenon that a conductive metal ore body and the oil and gas resource have significant difference in terms of the ion capacitivity, and the conductive metal ore body or the oil and gas is identified by combining the capacitivity and frequency effect index with the ion capacitivity, so as to improve the exploration efficiency of the conductive metal ore body or the oil and gas. In addition, the capacitivity and frequency effect index and the ion capacitivity in the test areas can be detected by using only the capacitivity and frequency effect index detection device and method provided by the present invention, without using other detection devices and methods to specifically detect ion capacitivity. In this way, it is possible to not only bring convenience for the user, but also reduce the number of the devices during the exploration, thereby reducing exploration costs and further improving the exploration efficiency.

In summary, in the present invention, it has found the important physical phenomenon that the oil and gas, water resource and conductive metal ore body sensitively affect the capacitivity and frequency effect index characteristics, which in turn lays a solid theoretical basis for identifying the oil and gas, water resource and conductive metal ore body based on the capacitivity and frequency effect index. The capacitivity and frequency effect index of the test areas can effectively be detected by using the capacitivity and frequency effect index detection device and method provide by the present invention, so as to provide a data support for subsequently identifying the exploration substances in the test areas based on the capacitivity and frequency effect index.

In addition, the exploration substance can be identified based on the detected capacitivity and frequency effect index by using the exploration substance identification method provided by the present invention, in order to be able to qualitatively analyze which type of substance the exploration substance belongs to. The entire identification process is very simple and convenient, and water resource can at least be determined by only using one physical parameter, i.e., the capacitivity and frequency effect index. The complex comparative analysis process is avoided while the exploration effectiveness of water resource is improved, and thus the exploration efficiency can also be significantly increased.

Furthermore, the present invention has also found the physical phenomenon that the conductive metal ore body and the oil and gas resource have a significant difference in terms of the ion capacitivity and used the phenomenon. The conductive metal ore body or the oil and gas is identified by combining the capacitivity and frequency effect index with the ion capacitivity, thus exploration effectiveness of the conductive metal ore body or the oil and gas can be improved. In addition, the capacitivity and frequency effect index and the ion capacitivity in the test areas can be detected by using only the capacitivity and frequency effect index detection device and method provided by the present invention without using other detection devices and methods to specifically detect the ion capacitivity. In this way, it is possible to not only bring convenience for the user, but also reduce the number of the devices used during the exploration, thereby reducing exploration costs and further improving the exploration efficiency.

The preferred embodiments of the present invention have been described in detail above in combination with the accompanying drawings, however, the present invention is not limited to the specific details of the above mentioned embodiments. A variety of simple variants of the technical solutions of the present invention may be made within the scope of the technical idea of the present invention. These simple variants all fall within the scope of protection of the present invention.

In addition, it is noted that the individual specific technical features described in the above embodiments, when not contradicted, can be combined in any suitable manner. In order to avoid unnecessary repeat, various possible combined forms will not be further explained in the present invention.

In addition, various different embodiments of the present invention can also be combined arbitrarily as long as it is not contrary to the idea of the present invention, which should also be regarded as the disclosure of the present invention.

The invention claimed is:

1. A capacitivity and frequency effect index detection device,
   wherein the device comprises:
   a signal generator for generating an alternating current signal having at least two different frequencies, and sending the alternating current signal to a current and phase information generation module;
   the current and phase information generation module for generating current information corresponding to each frequency when the alternating current signal flows through the current and phase information generation module;
   a first test electrode and a second test electrode, wherein the first test electrode is used to send to a first position in a test area the alternating current signal flowing through the current and phase information generation module; the second test electrode is used to provide a reference voltage at a second location in the test area and receive the alternating current signal flowing from the test area; and the first test electrode is also used to generate voltage information corresponding to each frequency after the alternating current signal flows back through the second position in the test area, and the voltage information is voltage information of the first position relative to the reference voltage of the second position; and
   a processing unit for receiving the current information corresponding to each frequency from the current and phase information generation module and receiving the voltage information corresponding to each frequency from the first test electrode; determining parameter information corresponding to each frequency according to the voltage information and the current information corresponding to each frequency, wherein the parameter information comprises reactive current, capacitive reactance, capacitance, and ion capacitivity, wherein the ion capacitivity is obtained based upon the capacitance and a predefined electrode coefficient; and determining the capacitivity and frequency effect index of the test area according to any two frequencies of the at least two different frequencies and the parameter information of the same type corresponding to the two frequencies;
   wherein the processing unit is further used to determine a water saturation according to the capacitivity and frequency effect index;
   wherein the water saturation is determined by the following equation:

$$Sw = a\frac{Fd^n}{\phi}$$

wherein
Sw represents the water saturation;
Fd represents the capacitivity and frequency effect index;
a represents a predetermined coefficient;
ϕ represents a porosity;
n represents a frequency dispersion index.

2. The detection device according to claim 1, wherein the capacitivity and frequency effect index is determined by the following equation:

$$F_d = \log_{f1/f2}(A_1/A_2)$$

wherein
Fd represents the capacitivity and frequency effect index;
$f_1$ represents a first frequency of the two frequencies;
$f_2$ represents a second frequency of the two frequencies;
$A_1$ represents a type of parameter information corresponding to the first frequency;
$A_2$ represents parameter information corresponding to the second frequency and in the same type with $A_1$.

3. The detection device according to claim 1, wherein each of the at least two different frequencies is greater than 0 Hz, and less than or equal to 10 KHz.

4. The detection device according to claim 1, wherein in the case that the detection device is used for ground exploration, the at least two different frequencies are selected from a frequency range of 0.001 Hz~1000 Hz; or, in the case that the detection device is used for logging, the at least two different frequencies are selected from a frequency range of 1 Hz~10000 Hz.

5. A capacitivity and frequency effect index detection method,
wherein the detection method comprises:
generating, via a signal generator, an alternating current signal having at least two different frequencies, and generating, via a current and phase information generation module, current information corresponding to each frequency;
sending, via a first test electrode, the alternating current signal to a first position in a test area;
providing, via a second test electrode, a reference voltage at a second location in the test area;
generating, via the first test electrode, voltage information corresponding to each frequency after the alternating current signal flows back through a second position in the test area, and the voltage information is voltage information of the first position relative to the reference voltage of the second position;
determining, via a processing unit, parameter information corresponding to each frequency according to the voltage information and the current information corresponding to each frequency, wherein the parameter information comprises reactive current, capacitive reactance, capacitance, and ion capacitivity, wherein the ion capacitivity is obtained based upon the capacitance and an electrode coefficient; and
determining, via the processing unit, the capacitivity and frequency effect index of the test area according to any two frequencies of the at least two different frequencies and the parameter information of a same type corresponding to the two frequencies;
wherein the method further comprises: determining a water saturation based on the capacitivity and frequency effect index;
wherein the water saturation is determined by the following equation:

$$\_Sw = a\frac{Fd^n}{\phi}$$

wherein,
Sw represents the water saturation;
Fd represents the capacitivity and frequency effect index;
a represents a predetermined coefficient;
ϕ represents a porosity;
n represents a frequency dispersion index.

6. The detection method according to claim 5, wherein the capacitivity and frequency effect index is determined by the following equation:

$$F_d = \log_{f1/f2}(A_1/A_2)$$

wherein
Fd represents the capacitivity and frequency effect index;
$f_1$ represents a first frequency of the two frequencies;
$f_2$ represents a second frequency of the two frequencies;
$A_1$ represents one type of parameter information corresponding to the first frequency;
$A_2$ represents parameter information corresponding to the second frequency and in the same type with $A_1$.

7. The detection method according to claim 5, wherein each of the at least two different frequencies is greater than 0 Hz, and less than or equal to 10 KHz.

8. The detection method according to claim 5, wherein in the case that ground exploration is performed, the at least two different frequencies are selected from a frequency range of 0.001 Hz~1000 Hz; or, in the case that logging is performed, the at least two different frequencies are selected from a frequency range of 1 Hz~10000 Hz.

9. An exploration substance identification method, wherein the identification method comprises:
obtaining a capacitivity and frequency effect index of a test area by using the capacitivity and frequency effect index detection method according to claim 5; and
identifying exploration substance in the test area as water resource in the case that the capacitivity and frequency effect index of the test area is more than or equal to an upper limit of percent frequency effect.

10. The identification method according to claim 9, wherein the upper limit of percent frequency effect is determined according to an average value of the capacitivity and frequency effect indexes of a plurality of test areas in an exploration area at which the test areas are located and a preset tolerance upper limit.

11. An exploration substance identification method, wherein the identification method comprises:
obtaining an ion capacitivity of a test area;
obtaining a capacitivity and frequency effect index of the test area by using the capacitivity and frequency effect index detection method according to claim 5; and
identifying exploration substance in the test area as a conductive metal ore body in the case that the capacitivity and frequency effect index of the test area is less than or equal to a lower limit of percent frequency effect and the ion capacitivity of the test area is more than or equal to an upper limit of ion capacitivity; or, identifying the exploration substance in the test area as oil and gas in the case that the capacitivity and frequency effect index of the test area is less than or equal to the lower limit of percent frequency effect and the ion capacitivity of the test area is less than or equal to a lower limit of ion capacitivity.

12. The identification method according to claim 11, wherein
- the upper limit of the ion capacitivity is determined according to an average value of the ion capacitivities of a plurality of test areas in the exploration area at which the test areas are located and a preset first tolerance upper limit;
- the lower limit of the ion capacitivity is determined according to an average value of the ion capacitivities of a plurality of test areas in the exploration area at which the test areas are located and a preset first tolerance lower limit;
- the upper limit of the percent frequency effect is determined according to an average value of the capacitivity and frequency effect indexs of a plurality of test areas in the exploration area at which the test areas are located and a preset second tolerance upper limit; and
- the lower limit of the percent frequency effect is determined according to an average value of the capacitivity and frequency effect indexs of a plurality of test areas in the exploration area at which the test areas are located and a preset second tolerance lower limit.

* * * * *